Sept. 22, 1964 J. L. SMITH, JR 3,149,976
METHOD OF ROASTING
Filed Feb. 19, 1960 6 Sheets-Sheet 1

INVENTOR.
JOSEPH L SMITH JR.
BY
ATTORNEY

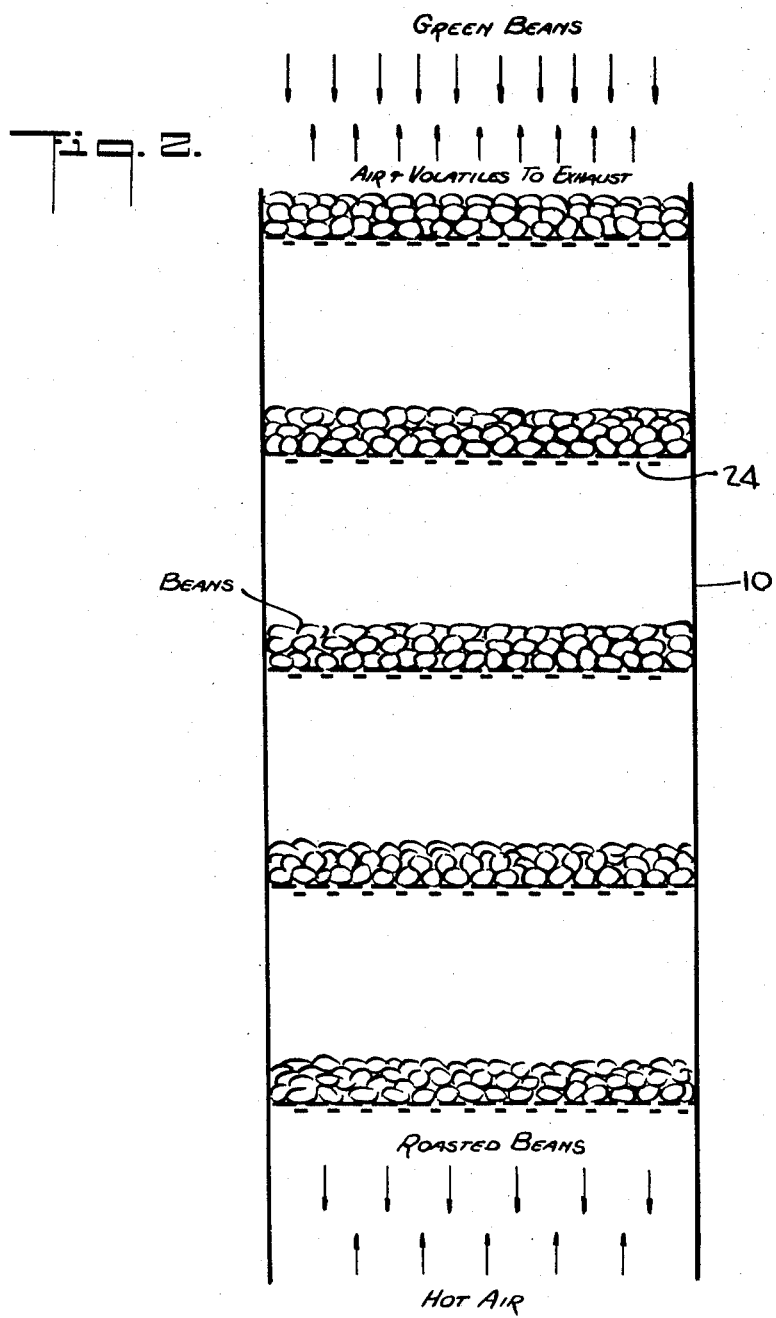

Sept. 22, 1964
J. L. SMITH, JR
3,149,976
METHOD OF ROASTING
Filed Feb. 19, 1960
6 Sheets-Sheet 3
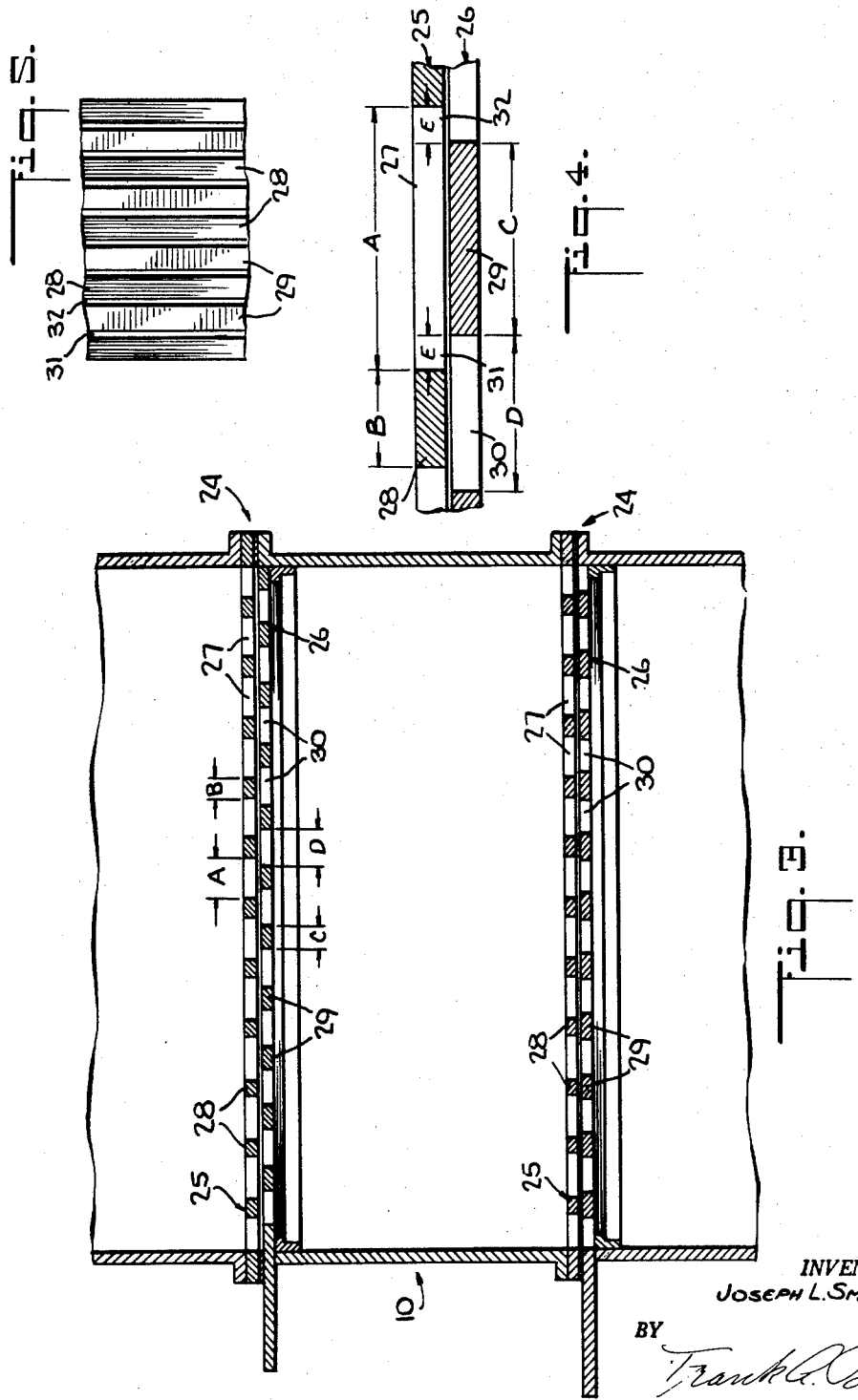
INVENTOR.
JOSEPH L. SMITH JR.
BY
*Frank A. Bower*
ATTORNEY

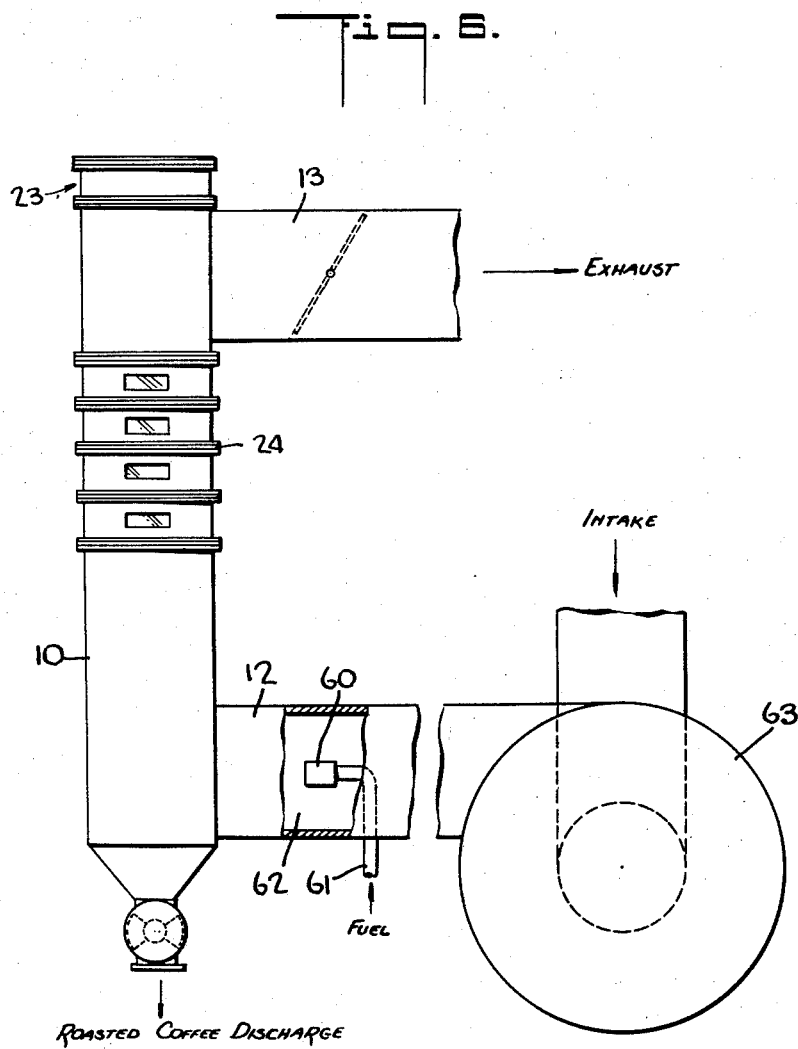

Sept. 22, 1964   J. L. SMITH, JR   3,149,976
METHOD OF ROASTING
Filed Feb. 19, 1960   6 Sheets-Sheet 5
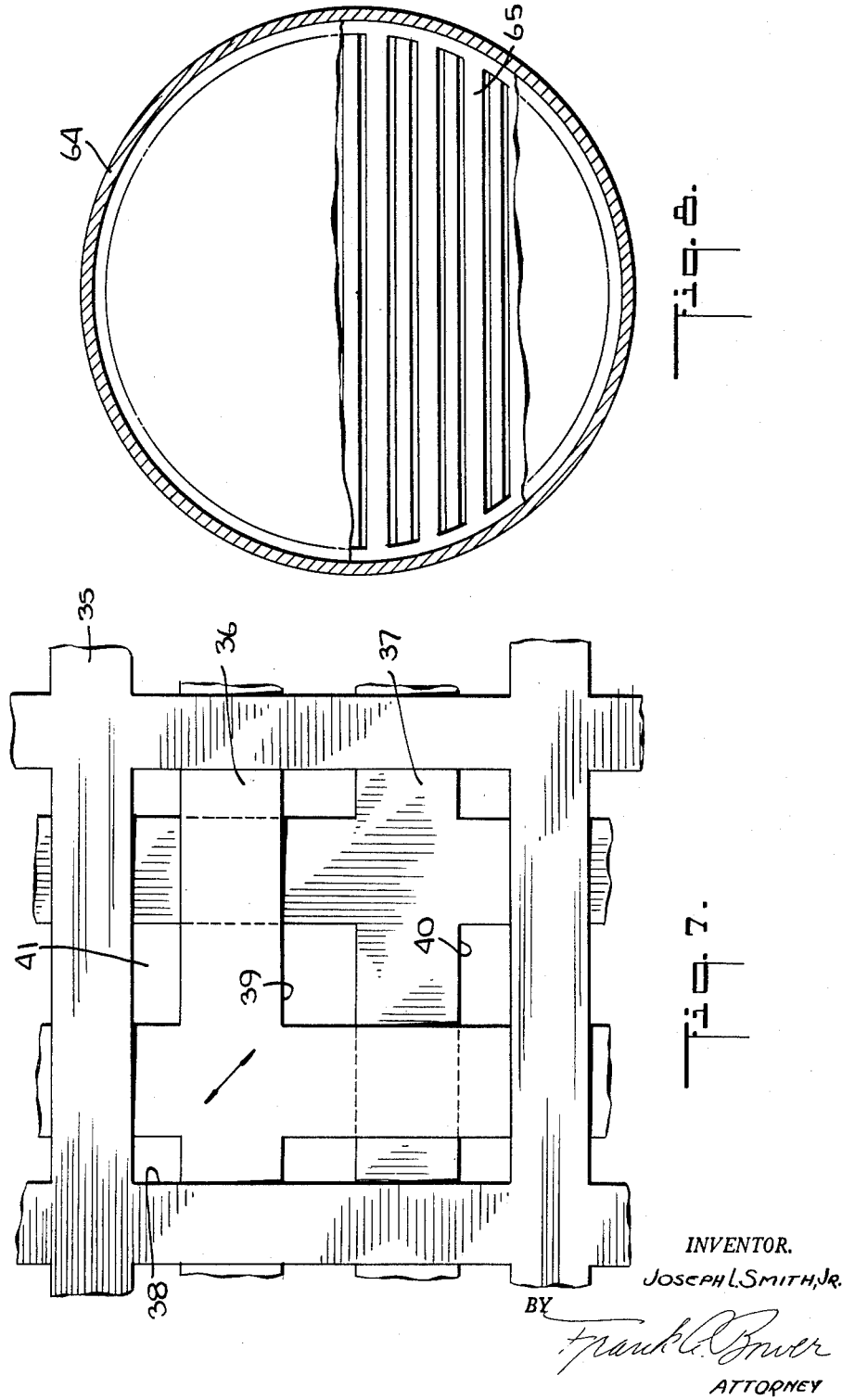
INVENTOR.
JOSEPH L. SMITH, JR.
BY
ATTORNEY

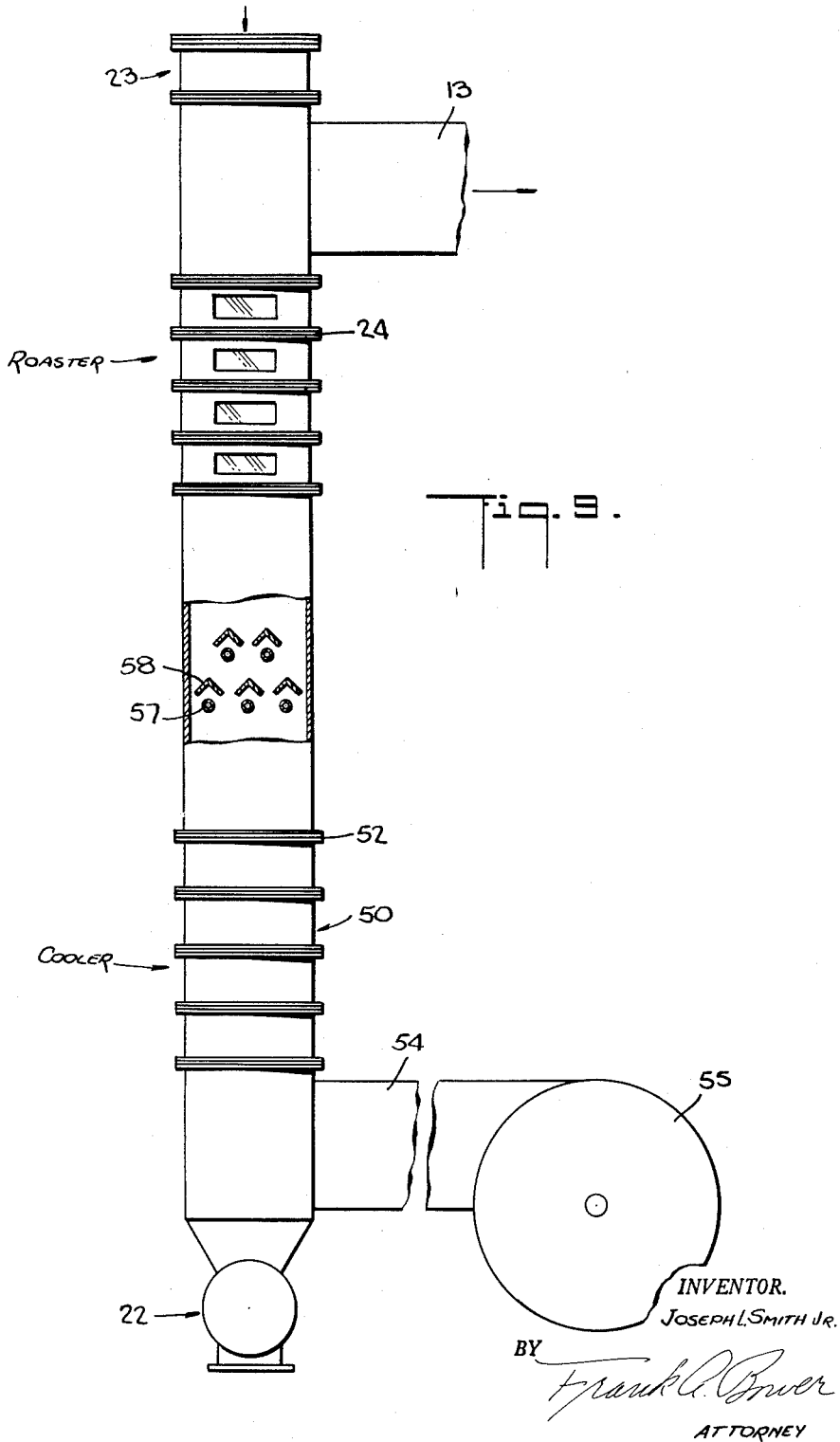

United States Patent Office 3,149,976
Patented Sept. 22, 1964

3,149,976
METHOD OF ROASTING
Joseph L. Smith, Jr., Concord, Mass., assignor, by mesne assignments, to Blaw-Knox Company, Pittsburgh, Pa., a corporation of Delaware
Filed Feb. 19, 1960, Ser. No. 9,943
3 Claims. (Cl. 99—68)

This invention relates to the roasting of granular organic material in synthetic or natural form and particularly relates to coffee beans, cocoa beans, peanuts, cereals and similar products by controlled fluidization. The invention is also directed to the apparatus for performing the process.

An object of the invention is to uniformly roast granular organic material in synthetic or natural form.

Another object of the invention is to uniformly, thoroughly, and rapidly roast each granule of a granular organic material.

Another object of the process of this invention is to uniformly, thoroughly and rapidly roast each coffee bean or the like in a series of batches of coffee beans by heated gases.

Another object of the invention is to provide a roasting apparatus that has a high throughput capacity and utilizes a small floor area.

Another object of the invention is to provide a roasting apparatus which requires a low ratio of heated gases to the amount of granular material roasted.

Another object of the invention is to provide a low ratio of fuel burned to the amount of granular material roasted.

Further objects and advantages of the invention will be apparent from the following description taken in connection with the accompanying drawings, in which:

FIG. 2 is a diagrammatic illustration of the relation of the hot gases and the coffee beans;

FIG. 3 is a vertical sectional view of the shelves supporting the individual layers;

FIG. 4 is an enlarged fragmentary view of a shelf;

FIG. 5 is a fragmentary top view of a shelf;

FIG. 6 is another embodiment with the burner in the supply duct;

FIG. 7 is a fragmentary view of another form of shelf;

FIG. 8 is a horizontal sectional view of a cylindrical drum; and

FIG. 9 is a side view of the combination of a vertical roaster and cooler.

Figure 1:
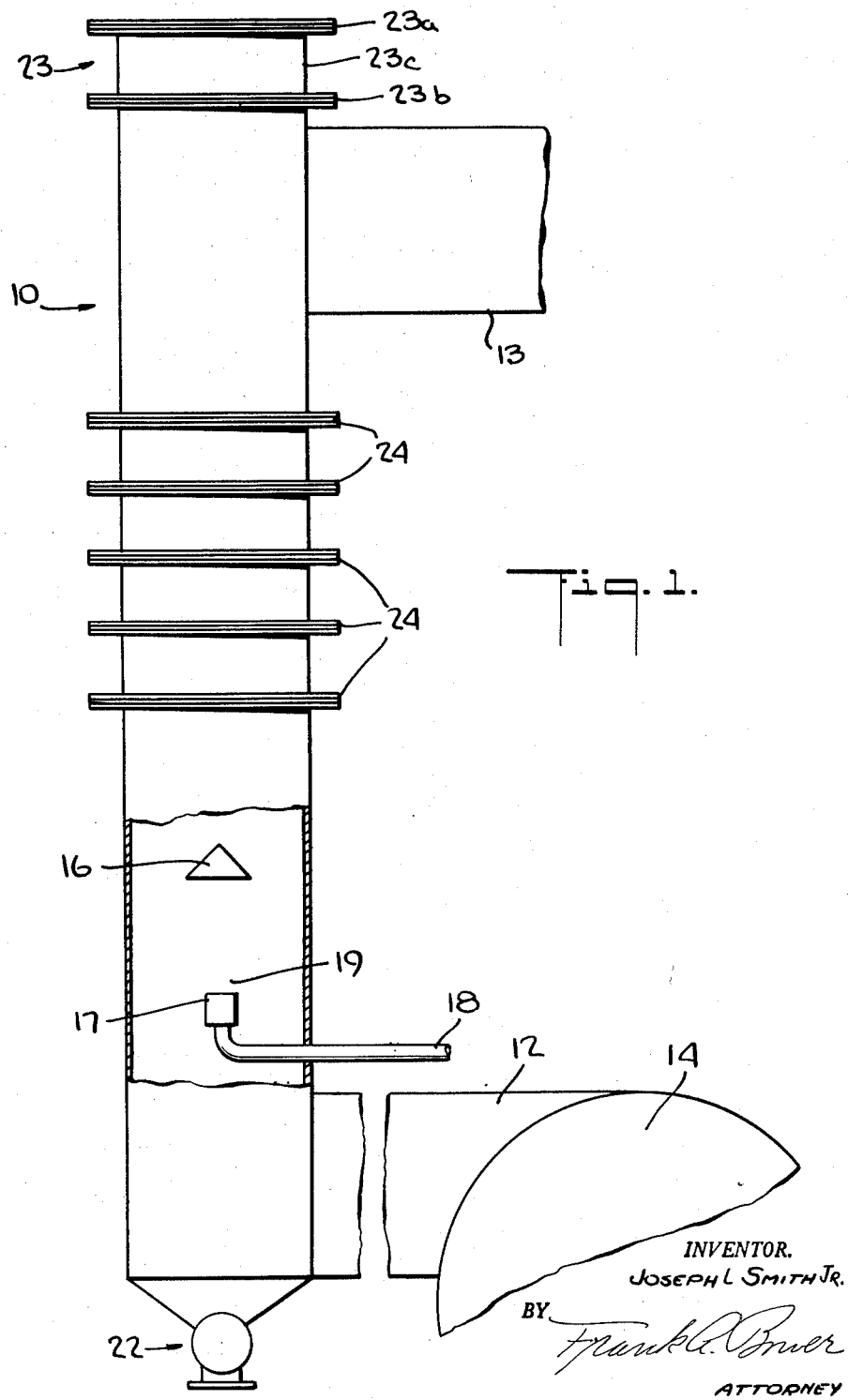
FIG. 1 is a schematic side view of the roaster.

The process and apparatus are described in connection with coffee beans as the granular organic material. The coffee beans are confined by successive shelves and subjected to an upward flow of heated gases. The batches of coffee on the shelves are successively moved downward in the roasting process from one shelf to the next lower shelf until the roasting process is completed. On each shelf the coffee beans are subjected to heated gases forced through slots or openings in the shelf which agitate the coffee so that the heated gases come in contact with the surface of each bean and strip the insulating boundary layer of air to thoroughly and rapidly roast each coffee bean.

Referring to FIG. 1, the roaster comprises a stationary hollow vertical conduit 10 having a rectangular, cylindrical or other suitable shape. The conduit forms a roasting chamber and has a number of perforated shelves 24 extending horizontally across the conduit and stacked vertically. At the top of the conduit, above the uppermost shelf, is a feed opening with a suitable air lock 23 preventing the escape of the coffee volatiles into the building housing the roaster. The air lock may comprise two vertically spaced slides 23a, 23b with a space 23c between. The shelves are operated to progressively move the batches of coffee supplied through the opening from the top shelf to the bottom shelf. The roasted batch is discharged through the bottom shelf into a suitable air lock. A rotary discharge valve 22 is illustrated. The valve 22 is at the bottom end of the conduit 10 and seals the bottom end of the roaster from atmosphere. Heated gases are provided below the bottom shelf to the roasting chamber by suitable means. An exhaust pipe 13 is connected to the conduit 10 above the top shelf to remove the gases with the coffee volatiles from the roasting chamber.

The means for exhausting the heated gases and coffee volatiles from the roasting chamber and the means for supplying the heated gases to the roasting chamber may be of conventional type of apparatus.

One embodiment is illustrated in the drawings.

The exhaust pipe 13 may discharge to atmosphere through a cyclone separator (not shown). As illustrated in FIG. 1, the heated gases may be provided by a burner 17 fed with fuel through the pipe 18 and with air by the conduit 12 connected to a blower 14. The fuel is burned in the combustion zone 19 and the heated gases delivered to the roasting chamber formed by the conduit 10. In the embodiments illustrated in FIGS. 1 and 9 the burner is in the conduit 10. In the embodiment illustrated in FIG. 6 the burner is located in the supply duct as described later herein.

The shelves 24 form the means for supporting the batches of coffee beans within the roasting chamber and permit the heated gases to pass through the coffee beans in a manner later described herein, and pass the coffee beans to the lower succeeding shelf on the completion of the roasting for a given stage. A preferred form of the shelves is illustrated in FIGS. 3, 4, and 5. The roasting process will be discussed later herein in connection with these shelves.

The shelves 24 extend horizontally across the entire passage of the vertical conduit 10 and in a preferred form comprise a stationary portion 25 and a movable portion 26 positioned underneath the stationary portion 25. The stationary portion 25 comprises a plurality of parallel slots 27 extending across the width of the vertical conduit forming the parallel bars 28. The slots 27 have a width A and the bars 28 have a width B. The movable portion has bars 29 of a width C forming slots 30 of a width D. The bars 29 and slots 30 extend in the same direction as the bars and slots 28 and 27. The width C of the bars 29 is less than the width A of the slots 27 so that when the bars 29 are positioned below the slots 27 slots 31, 32 are formed on each side thereof having a width E. The bars 29 prevent the beans from dropping through the slot 27, yet provide for the passage of the heated gases through the slots 31, 32.

When the roasting period for a particular shelf is completed, the movable portion 26 is shifted to move the bars 29 under the bars 28 and thus bring the slots 27 and 30 into alignment so that the beans will drop quickly as a batch through to the lower shelf. The bars 28 preferably should be such as not to individually support a bean. The dimensions of the bars 28 and 29 are such that the beans will topple off the bars 28 and through the opening 27. The movable portion 26 is slideably supported by a flange 34 mounted on the wall of the vertical conduit. The shelves are actuated by a suitable timing mechanism to empty the lower shelf first and then the next highest. By having an additional shelf that is empty two layers may be moved at the same time. The lowest layer may be discharged and another layer dropped to a lower level.

A triple drop may be produced by having two empty shelves during the roasting operation.

The lowest shelf 24 is emptied to discharge the coffee through 22 so that the next layer may drop on a clean shelf. The burner has a guard 16 to deflect the coffee beans away from the flame. The actuating mechanism may be a plurality of solenoids, one for each shelf, actuated by a synchronizing electrical control circuit which energizes the solenoids in a timed relation.

The relationship of the widths of the bars and slots may be different for each shelf. The width E in particular may be different. The temperature, content and velocity of the gases passing through the highest shelf are different from the gases passing through the lowest shelf.

The heated gases are delivered to the roasting chamber in large volume and are forced upwardly and successively through the shelves supporting the coffee beans. The temperature of the gases entering the chamber may be in the range of 400° to 800° F. The coffee beans are distributed in a layer across the shelves. The heated gases pass through the orifice formed by the overlap of slots 31, 32. The velocity and volume of the heated gases agitate the coffee beans so that the coffee beans are in a free relationship with every other bean and are free to agitate the beans but not sufficient to lift the beans out of the beds. The beans should remain as an agitated layer on the shelf. The force of the air strips the stagnant boundary layer from the bean so that a rapid transfer of heat occurs from the heated gases to the coffee bean. The agitation of the individual coffee beans insures that each bean will be uniformly treated by the heated gases and thoroughly roasted.

The thickness of the layer of coffee beans depends upon the width of the orifice formed by the overlap of slots 31, 32 and the volume and velocity of the heated gases. The coffee beans are formed into a series of separate batches arranged in separate and distinct layers on vertically spaced shelves. The batches at each of the levels retain their characteristic as layers during the roasting process and are moved successively downward as a batch in timed relation from one shelf to the next succeeding shelf. The heated gases move upwardly through successive layers of the coffee beans. The uppermost layer of coffee beans is at the lowest temperature and the lowest layer of coffee beans is at the highest temperature. All of the coffee beans in any given layer are at the same temperature so that all the beans are roasted the same at each level. Each layer of coffee beans are at a higher temperature than the layer above. The movement of a batch from one shelf to the next lower shelf is positive and completely moves the entire batch quickly and substantially as a unit. The batches move from one roasting level to the next without any dwell between levels. Each bean at each level is exposed to the heated gases and preferably roasted at each of the levels for the same fixed and definite time as every other bean. The stream of gases through the slots in the shelves should impart a vibratory movement to jiggle and agitate the coffee beans in the layer to strip the boundary air layer and to bring the heated gases into contact with each of the beans in about the same manner. The layer should be kept relatively thin for the free agitation of the coffee beans and may be in the range of from 2 to 8 coffee beans.

An important feature of the process is the small temperature drop experienced by the heated gases as they pass through each layer of coffee beans. Since each coffee bean is heated by the gases immediately adjacent to it the temperature of the gases throughout each layer should be within a limited or given range so that each bean is roasted approximately the same whether at the top or the bottom of the layer.

The temperature difference between the gases entering at the bottom of the layer and the gases discharged at the top of the layer should not be sufficient to produce a substantially different roasting of beans remaining always at the top and beans remaining always at the bottom. For coffee beans the temperature differential between the gases entering a given layer is preferably in the order of 25° to 50° F. The temperature drop through a given layer will be a fraction of the total temperature drop across a plurality of shelves.

The granular material is roasted in a layer formation. The layer formation and the flow of heated gases are related to produce a desired temperature drop between the upper and lower surfaces so as to roast granules at the top and bottom substantially the same and related to produce a churning action of the granular material within the layer formation to provide a uniform roasting of the material by the flow of gases.

The heated gases successively pass upward through the coffee layers with a temperature drop and pressure drop occurring across each layer. The highest temperature gases passing first through the most highly roasted and highest temperature layer of coffee beans and the lowest temperature gases passing through the green beans. The shelves have openings to form the heated gases into streams to agitate the beans. The pressure and velocity of the streams impart movement of the beans while maintaining the beans as a layer. Individual beans may be momentarily and occasionally carried by the streams out of the layer into the space above. The heated gases do not maintain the individual beans in the space above the layer. The openings in the shelf are close together so the streams of gases are in close proximity and no stagnant areas occur in the layer. The heated gases coming in contact with the beans strip the boundary air layer off the beans and transfer heat to the beans. The heated gases flow through the entire cross section of the conduit 10 and all of the openings of the shelf. The streams of heated gases are evenly distributed throughout the layer to subject the coffee beans in each section to the same roasting action.

The agitation or vibration of the coffee beans in several thin layers and the rapid rate of heat transfer from the hot gases to the coffee bean provide for a control of the roasting time and temperature of each coffee bean as it proceeds through the roasting chamber. By the number of shelves and the amount of coffee carried by each shelf, the roasting time and temperature of the batch on each shelf may be varied. The coffee bean is thus progressively subjected to successively controlled roasting steps which may be varied. This results in a properly roasted coffee. It also permits an adaptation of the roaster to different types of roasting processes and different types of coffee beans.

An overall feature of the roasting process and apparatus is that the coffee beans are moved counter to the flow of the heated gases. Thus the green beans are introduced in the lower temperature heated gases and the finally roasted beans are subjected to the high temperature heated gases. This counterflow of the heated gases to the movement of the coffee beans permits low temperatures of the vented or exhausted gases. The temperatures of the exhausting gases may be of the order of 140–150° F.

With the coffee beans spread across the roasting chamber, the area through which the heated gases pass is the same as that covered by the batch of coffee. The movement of the heated gases successively through the batches reduces the volume of the heated gases required as well as reduction of dead space and permits a higher pressure of the heated gases. This higher pressure and smaller flow result in a low ratio of the size of the roasting chamber and the amount of coffee beans processed.

The variation in the opening between the bars 28 and 29 and the movement of the heated gases through the shelves and then through the coffee beans produce a self-cleaning of the shelves. Also the agitation of the coffee beans by the heated gases and the dropping of the coffee beans from one shelf to another while in the stream of heated gases produce a separation of dust and chaff from the coffee beans so that the final roasted coffee product is clean and does not require a subsequent cleaning operation.

Other configurations and structures may be used for providing shelves 24 that have variable sized openings to intermittently support and discharge the coffee beans. For example, in FIG. 7 three webbed members 35, 36, 37 have rectangular openings 38, 39, 40 respectively. Two of the members are movable and one member is stationary. For example, member 35 may be stationary and members 36 and 37 may be movable. The movable members move diagonally, as indicated by an arrow, to coincide with the stationary member 35 so that the three members are in alignment and the beans can fall through the unobstructed openings 38, 39, 40. In the overlapping or roasting position as illustrated in FIG. 7 small square openings 41 are provided for the passage of heated gases.

In FIG. 6 the conduit 12 has a burner nozzle 60 fed with fuel by pipe 61. The fuel is burned in combustion chamber 62 and the heated air and gases are delivered to the conduit 10 from the conduit 12. Means may be provided in the conduit 12 to smooth the flow of air from the blower 63.

In FIG. 8 a cylindrical vertical conduit 64 is shown with shelves 65 similar to that illustrated in FIG. 3. The cylindrical conduit has the advantage of utilizing all of the area within the drum and provides for a more uniform flow of the gases through the conduit and is the preferred form.

In FIG. 9 the combination of a roaster and cooler is illustrated. The feed 23, exhaust 13 and the shelves 24 in the roasting chamber may be similar to the roaster shown in FIG. 1. The cooler is positioned below the roaster and has a vertical hollow conduit 50 which in this embodiment is aligned with the conduit 10. Perforated cooling shelves 52 extend horizontally across the conduit 50 and are similar to those of the roaster. The cooling air or gases are delivered to the conduit 50 by the blower 55 through pipe 54. The roasted coffee is dropped vertically from the bottom shelf in the roasting chamber past the burners 57 on to the upper shelf of the cooler. The roasted coffee is progressively moved downwardly to lower shelves and then finally discharge through the rotary valve. The cooling medium passes through the coolest layer first and through the hottest coffee last. The cooling medium is in turn heated and is supplied to the burners 57 as preheated air. Thus the heat of the coffee is recovered. The burners 57 have shields 58 to deflect the roasted coffee beans from passing through the flames of the burner. The cooling gases passing up through the successive shelves agitate the roasted beans in a manner similar to that of the coffee processed by the roaster. The high velocity flow of the cooling gases produces a rapid transfer of heat from the coffee bean to the cooling gases to provide for a rapid reduction in temperature of the roasted coffee. The cooler may be separated from the roaster and means provided to feed the roasted coffee beans from the roaster to the cooler. The heated air discharged by the cooler is fed to the intake of the roaster to recover the heat.

It is thus seen from the foregoing description that a new process for rapidly roasting coffee beans has been developed that permits a reduced size of the roasting apparatus and associated heated gas and discharge means, so that a smaller floor area is required in relation to the amount of coffee processed than in the present horizontal rotary drum types. Further, a new and different roasting action is imparted to the coffee beans which results in a more uniform and cleaner coffee roast.

Although the process and apparatus have been described in connection with coffee beans the process and apparatus may be used to roast other granular organic materials in processed or natural form. The material may be formed in pellets from vegetable matter or the like or may be cereals, peanuts, cocoa beans, and similar products. The temperatures and time of the roasting period are different. The temperatures are lower. The shelves are adapted to accommodate difference in the size and weight of the product roasted.

Various modifications may be made in the apparatus which will result in the performance of the process described above. The inventions set forth in the foregoing description are defined in the appended claims.

I claim:

1. Process for continuously roasting organic material in the form of granules taken from the group consisting of coffee beans, cocoa beans, peanuts and cereals in layer formation comprising simultaneously roasting granules at a plurality of separate roasting levels in vertical arrangement with the granules retained in the layer formation at a respective level with the uppermost level having the least roasted batch and the lowermost level having the most highly roasted batch, intermittently discharging the fully roasted batch from the lowermost level and sequentially lowering the granules on a respective level to the next lower level, intermittently feeding granules to the emtpy uppermost level, supplying hot gases below the lowest level and successively passing hot gas through the levels reducing the temperature of the gases through each successive layer, agitating and circulating the granules in granule contacting layer formation at each level while retaining the space above the layer substantially free of granules to pass the hot gases around the individual granules to strip the boundary layer of gases and rapidly and uniformly transfer heat to the individual granules for extracting moisture and volatiles therefrom and uniformly roasting the granules.

2. A process for continuously roasting material in the form of separate granules taken from the group consisting of coffee beans, cocoa beans, peanuts and cereals from unroasted to fully roasted granules comprising simultaneously roasting separate batches of granules in layer formation at a plurality of separate roasting levels in vertical arrangement with the uppermost level having the least roasted batch of granules and the lowermost level having the most highly roasted batch of granules, intermittently discharging a fully roasted batch of granules from the lowermost level, sequentially lowering the separate batches of granules to the succeeding lower roasting level as a batch, intermittently feeding batches of unroasted granules to the periodically empty uppermost level, supplying hot gases below the lowermost level, passing hot gases through the batch of granules at each level and agitating and moving the individual granules at each level with the granules retained in the layer at a respective level to rapidly transfer heat to the individual granules and uniformly roast the granules at each level over a given time and temperature to form a uniform and complete roast of the granules.

3. A process for continuously roasting material in the form of separate granules taken from the group consisting of coffee beans, cocoa beans, peanuts and cereals comprising simultaneously roasting for a given period separate batches of granules in layer formations at a plurality of separate roasting levels in vertical arrangement with the granules retained in the layer at a respective level and with the uppermost level having the least roasted batch and the lowermost level having the most highly roasted batch of granules, supplying hot gases to flow upwardly through successive and separate layers, agitating the individual granules in a thin layer formation with the granules in contact with adjacent granules at each level with streams of heated gases to rapidly transfer heat and maintain the temperature differential of the heated gases entering the layer and the heated gases discharging within a desired range to uniformly roast the granules retained for a given period of time in layer formation without passing any granules during the given period at each level, dropping the uniformly partially roasted granules to the next lower level at the end of the given period for passing heated gases at high temperatures to further roast the batch of granules over the given period and discharging the completely and uniformly roasted batch from the lowest level.

References Cited in the file of this patent

UNITED STATES PATENTS

| | | |
|---|---|---|
| 890,031 | Dornfeld | June 9, 1908 |
| 2,440,884 | Yglesias-Paz | May 4, 1948 |
| 2,715,282 | Niven | Aug. 16, 1955 |
| 2,740,698 | Helwig | Apr. 3, 1956 |
| 2,857,683 | Schytil | Oct. 28, 1958 |